United States Patent

[11] 3,557,305

[72] Inventor Bert H. Dann
Altadena, Calif.

[21] Appl. No. 711,072
[22] Filed Mar. 6, 1968
[45] Patented Jan. 19, 1971
[73] Assignee Bell & Howell Company
Chicago, Ill.
a corporation of Illinois

[54] DC RESTORATION AND WHITE CLIPPING CIRCUIT FOR VIDEO RECORDER
9 Claims, 1 Drawing Fig.

[52] U.S. Cl. .......... 178/7.3, 178/7.1, 178/7.5
[51] Int. Cl. .......... H04n 5/16, H04n 5/18
[50] Field of Search .......... 178/7.1DC, 7.3DC, 7.5DC, 7.5trans., 6GAMMA; 330/11, 19, 20, 29; 307/237

[56] References Cited

UNITED STATES PATENTS

| | | | |
|---|---|---|---|
| 2,850,627 | 9/1958 | Moore et al. | 178/7.1DC |
| 2,995,621 | 8/1961 | Freedman et al. | 178/7.5 trans. |
| 3,267,387 | 8/1966 | Felix | 330/19 |
| 3,413,562 | 11/1968 | Hartin et al. | 330/20 |
| 3,435,359 | 3/1969 | Sennhenn | 330/29 |

*Primary Examiner*—Richard Murray
*Assistant Examiner*—George G. Stellar
*Attorney*—Christie, Parker & Hale

ABSTRACT: There is described a transistorized direct-coupled amplifier circuit which receives a composite video color signal, amplifies the signal and at the same time establishes a fixed DC level for the sync tips and slices the "white" peaks of the video signal at a predetermined level. The amplifier includes a feedback loop which includes a sync tip detector with a relatively long time constant on the output for controlling the DC operating point of the direct coupled amplifier. The amplifier exhibits good linearity up to its predetermined signal level, after which the output remains substantially constant as the signal increases beyond this level.

PATENTED JAN 19 1971 3,557,305
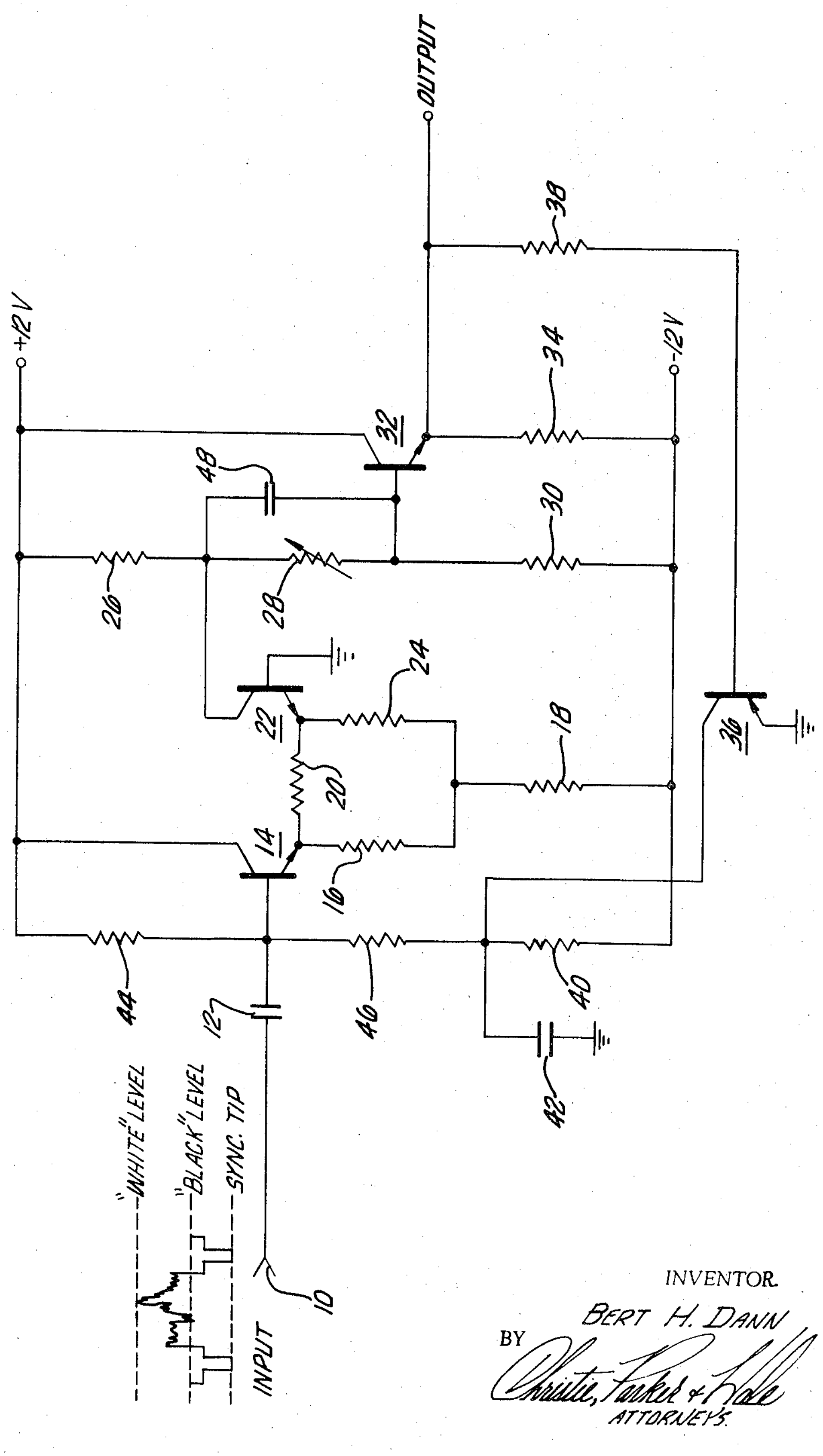
INVENTOR
BERT H. DANN
BY Christie, Parker & Hale
ATTORNEYS.

DC RESTORATION AND WHITE CLIPPING CIRCUIT FOR VIDEO RECORDER

BACKGROUND OF THE INVENTION

1. Field of the Invention

This invention pertains to a circuit which finds particular application in video tape recorders but is useful wherever DC restoration and "white" peak clipping are required, such as in a television camera circuit. In any recording system, a composite video signal is derived either by a conventional tuner for detecting standard television broadcasts or from a camera system which generates such signal. The composite signal must be amplified, the DC level of the sync tips must be fixed, and the "white" peaks of the video signal must be limited before the composite signal is applied to a modulator for providing a modulated carrier to record on the tape.

2. Prior Art

Each of the functions of a DC restorer, a video amplifier, and a "white" clipper are well known in the art. The present invention has the advantage that all of these functions are combined in a single circuit at a considerable savings in complexity and cost. Furthermore, the present invention avoids the conventional use of diodes which are normally back-biased and driven conductive to establish a clipping level. Diodes have the problem that the reactance varies as the back bias voltage varies. This presents a problem, particularly in the processing of color signals, because such clipping circuits introduce large differential phase effects on the chrominance component of the composite signal. The present circuit has the advantage that it introduces very little deterioration of overall picture quality even at a high clipping level.

SUMMARY OF THE INVENTION

The circuit of the present invention comprises a direct coupled amplifier having a transfer characteristic that is linear over a range of input levels but which abruptly levels off at some predetermined input level. The composite signal is AC coupled to the amplifier from a voltage source of the composite video signal. The output is coupled to a sync tip detector circuit which provides a DC signal proportional to the departure of the level of the sync tips of the amplified output signal from a predetermined level. This DC signal is applied to the input of the amplifier to control the DC level of the sync tips of the output signal to maintain the sync tips at the predetermined reference level, and at the same time to fix the level at which clipping occurs on the "white" peaks of the video signal. Thus the output has the sync tip level maintained constant by the circuit relative to a fixed reference potential, such as ground, and the "white" peaks of the composite input are sliced or clipped at some level fixed in relation to the sync tip level by the transfer characteristic of the amplifier. The circuit provides linear voltage gain at all signal levels in between.

DESCRIPTION OF THE DRAWINGS

For a more complete understanding of the invention, reference should be had to the accompanying drawing wherein the single FIG. is a schematic diagram of the circuit of the present invention.

DESCRIPTION OF THE PREFERRED EMBODIMENT

Referring to the drawing in detail, a composite video signal is applied to an input terminal 10 from a suitable voltage source. As shown by the input waveform of a portion of the composite signal, the sync tip is a negative-going pulse occurring at the horizontal sync frequency. Between sync tips, video information for one line scan varies between the "black" level and the "white" level. The sync tips extend below the "black" level and the "white" peaks of maximum amplitude in the positive direction should be limited to the "white" level. In the case of color television, the video signal includes both the luminance and chrominance information. In addition, each sync tip is followed by a color burst which provides a reference phase for detecting color information. Such standard television signals are well known in the art.

The composite video signal is AC coupled through a capacitor 12 to the base of an emitter-follower stage including a transistor 14. The collector of the transistor 14 is connected to the positive terminal of a potential source (not shown), while the emitter is connected by an emitter resistor 16 to a negative terminal of the potential source through a relatively large resistor 18. The large resistor 18 in series with the potential source acts as a substantially constant current source.

The emitter-follower stage may be coupled through an impedance shown as a resistor 20, to the emitter of a common base amplifier stage including a transistor 22. The resistor 20 may be modified to provide a frequency-sensitive characteristic, such as a resistor and a capacitor in series to introduce high frequency compensation.

The emitter of the transistor 22 is connected through an emitter resistor 24 to the constant current source resistor 18. The base is connected to an intermediate potential, such as ground, while the collector is connected through a load resistor 26 to the positive terminal of the potential source.

The output is derived from a voltage divider extending between the collector of the transistor 22 and the negative terminal of the potential source, the voltage divider consisting of a variable resistor 28 and fixed resistor 30. The output is applied to a second emitter-follower stage including a transistor 32 having an emitter resistor 34. The amplified composite video signal is derived across the emitter resistor 34.

The output signal is applied to a sync detector circuit including a transistor 36 whose emitter is connected to a fixed reference potential, such as ground. The amplifier output signal is applied to the base of the transistor 36 through a series resistor 38 and the collector is connected through a load resistor 40 to the negative terminal of the potential source. A large capacitor 42 provides integration or averaging of the output by the sync tip detector. This average level is coupled to the base of the first emitter-follower stage transistor 14 by means of a voltage divider circuit comprising a resistor 44 and a resistor 46.

Typical values of the components of the circuit are as follows:

| | | |
|---|---|---|
| Resistor 44 | | 100K |
| Resistor 46 | | 39K |
| Resistor 40 | | 39K |
| Resistor 16 | ohms | 150 |
| Resistor 24 | do | 150 |
| Resistor 18 | do | 3, 900 |
| Resistor 26 | do | 2, 200 |
| Resistor 28 | do | 8. 2K–13. 2K |
| Resistor 30 | | 27K |
| Resistor 34 | ohms | 820 |

In operation, the potential at the junction of resistors 40 and 46 is initially at some level determined by the value of the voltage divider resistors 40, 44 and 46. During the portion of the input signal that the negative-going sync tips drive the base of the transistor 14 more negative, the collector-to-emitter current through the transistor 14 is reduced, which in turn increases the current from the constant current source through the transistor 22, causing the collector of the transistor 22 to go more negative in phase with the sync tip. This in turn reduces the current through the transistor 32 causing the output signal to go more negative in synchronism with the sync tip. However, because of the direct coupled character of the amplifier, the DC level of the sync tip at the output is fixed in relation to the DC level of the base of the transistor 14.

If, because of changes in the DC component of the composite video signal, the sync tip level of the output attempts to change, this changes the average voltage across the resistor 40. Only during the sync tips of the output is the transistor 36 turned on, so that the voltage across the resistor 40 is proportional to the DC level of the sync tips relative to the reference potential amplified to the emitter of the transistor 36. In the example shown, this is ground reference potential, but may be selected at any other appropriate reference potential level.

The voltage across the resistor 40 in turn sets the level at the input of the emitter stage 14 so as to maintain the DC level of the sync tips at the output fixed. Thus the circuit operates as an effective DC restorer for the composite video signal.

During the positive-going portion of the input signal occurring at the "white" peaks of the video signal, the emitter-follower stage 14 becomes more conductive, taking more current from the constant current source. At the same time, the transistor 22 is driven towards cutoff and the collector goes more positive. However, the "white" peak level at the output of the common base stage 22 is limited by the level at which the transistor 22 cuts off completely. Any further increase in the amplitude of the "white" peaks of the input signal produces no further change in the level of the output, thus effectively limiting the positive-going swing of the output signal.

The variable resistor 28, by shifting the internal operating conditions of the amplifier, provides a means of changing the peak-to-peak swing of the output. Since the level of the sync tips at the output is held fixed, changes in the resistor 28 change the level at which the "white" peaks are clipped. A capacitor 48 is connected in shunt with the variable resistor 28 to assure that AC or small signal gain of the amplifier remains constant despite variations in resistor 28.

It should be noted that, although the first stage of the amplifier is shown as an emitter-follower in the preferred embodiment, an output could be derived from the collector of the first stage by providing a collector resistor. The maximum current level through the collector of the first stage is fixed by the constant current source when the second stage is cut off. Thus a clipped output signal could be derived in this manner from the first stage if an inverted version of the input signal was required.

I claim:

1. A DC restoration and clipping circuit for a composite video signal having sync tip peaks in one direction of signal swing and "white" peaks in the other direction of signal swing, comprising a two stage direct coupled transistor amplifier including a first stage to which the composite input signal is AC coupled, and second stage arranged such that when the DC input level to the first stage exceeds a predetermined level during "white" peak swings of the input, the second stage is cut off, means coupled to the output of the second stage for detecting peaks in the output corresponding to sync tip peaks in the input signal, and means coupled to the peak detecting means for adjusting the DC level at the input to the first stage in response to changes in the average level of the detected sync tip peaks at the output, whereby the sync tip level at the output remains fixed.

2. Apparatus as defined in claim 1 wherein the peak detecting means includes a transistor having a first electrode coupled to the output of the amplifier, a second electrode coupled to a fixed reference potential, and a third electrode connected to a potential source through a relatively large load resistance and connected to said fixed reference potential through a large capacitor, the load resistor and capacitor having an R–C time constant that is long compared to the period between sync tips of the composite video signal, the input to the first stage being connected to said third electrode to control the DC level at the input to the direct coupled amplifier.

3. Apparatus as defined in claim 1 wherein the direct coupled amplifier includes first and second transistors, means for AC coupling the input to the base of the first transistor, means connecting the collector of the first transistor to one side of a potential source, means connecting the collector of the second transistor to said one side of said source, and the base of the second transistor being connected to an intermediate fixed reference potential, separate emitter resistors connecting the emitters of both transistors to the other end of said source, and means for maintaining the combined current from said potential source through the two transistors substantially constant.

4. Apparatus as defined in claim 2 wherein the direct coupled amplifier includes first and second transistors, means for AC coupling the input to the base of the first transistor, means connecting the collector of the first transistor to one side of a potential source, means connecting the collector of the second transistor to said one side of said source, and the base of the second transistor being connected to an intermediate fixed reference potential, separate emitter resistors connecting the emitters of both transistors to the other end of said source, and means for maintaining the combined current from said potential source through the two transistors substantially constant.

5. Apparatus as defined in claim 3 wherein the means connecting the collector of the second transistor to the source includes a load resistor, the load resistor being connected as part of a voltage divider connected across said potential source, the output of the amplifier being derived from a tap on the voltage divider, the portion of the voltage divider between the collector end of the load resistor and the output tap including a variable resistor for adjusting the peak-to-peak swing of the output.

6. A circuit for restoring a DC level to the peaks of one polarity of an AC signal and clipping the peaks of the opposite polarity, comprising a direct coupled amplifier, the amplifier having a transfer characteristic that is linear over a range of input levels and that levels off abruptly at one end of the linear range, means for detecting the signal peaks of said one polarity at the output of the amplifier, said detecting means including means for comparing the detected peaks with a reference potential, means responsive to the detecting means for controlling the DC level at the input of the amplifier to maintain the level of said detected peaks constant in relation to said reference potential, and means for adjusting the DC level at the input to a level within said linear range such that peaks of the input signal of said opposite polarity swing the input out of the linear range when said opposite polarity peaks of the input signal exceed a predetermined amplitude.

7. Apparatus as defined in claim 6 wherein said direct coupled amplifier includes first and second transistors, a constant current source, means for connecting the collectors of said transistors to one terminal of said source, means including separate resistors in series with the respective emitters of the two transistors connecting the emitters to the other terminal of said source, means for holding the base of one transistor at a constant reference potential, the input signal being coupled to the base of the other transistor.

8. Apparatus as defined in claim 6 wherein the peak detecting means includes a transistor having a first electrode coupled to the output of the amplifier, a second electrode coupled to a fixed reference potential, a third electrode connected to a potential source through a relatively large load resistance and connected to said fixed reference potential through a large capacitor, the load resistor and capacitor having an R–C time constant that is long compared to the period between peaks of said one polarity, and resistor means connecting said third electrode to the input to the amplifier to control the DC level at the input to the amplifier.

9. Apparatus as defined in claim 7 wherein the peak detecting means includes a transistor having a first electrode coupled to the output of the amplifier, a second electrode coupled to a fixed reference potential, a third electrode connected to a potential source through a relatively large load resistance and connected to said fixed reference potential through a large capacitor, the load resistor and capacitor having an R–C time constant that is long compared to the period between peaks of said one polarity, and resistor means connecting said third electrode to the input to the amplifier to control the DC level at the input to the amplifier.